United States Patent [19]

Sato et al.

[11] Patent Number: 5,723,569
[45] Date of Patent: Mar. 3, 1998

[54] RANDOM COPOLYMERIZED POLYAMIDE RESIN AND PROCESS FOR PREPARING THE SAME

[75] Inventors: Shin-ichi Sato; Masaaki Miyamoto; Kenji Tsuruhara, all of Fukuoka-ken; Yoshiaki Ohtani, Kanagawa-ken, all of Japan

[73] Assignee: Mitsubishi Chemical Corporation, Tokyo, Japan

[21] Appl. No.: 710,256

[22] Filed: Sep. 13, 1996

[30] Foreign Application Priority Data

Sep. 13, 1995 [JP] Japan ............... 7-235111

[51] Int. Cl.$^6$ .................................................. C08G 69/36
[52] U.S. Cl. .................. 528/310; 528/311; 528/312; 528/313; 528/315; 528/318; 528/323; 528/335; 528/340; 528/347
[58] Field of Search .................. 528/310, 313, 528/312, 315, 318, 311, 323, 335, 340, 347

[56] References Cited

U.S. PATENT DOCUMENTS

| | | | |
|---|---|---|---|
| 3,583,947 | 6/1971 | Schmidt et al. | 528/313 |
| 3,879,354 | 4/1975 | Bonner | 528/313 |
| 4,596,865 | 6/1986 | Gabbert et al. | 528/313 |

FOREIGN PATENT DOCUMENTS 53010693  9/1993  Japan.

*Primary Examiner*—P. Hampton-Hightower
*Attorney, Agent, or Firm*—Oblon, Spivak, McClelland, Maier & Neustadt, P.C.

[57] ABSTRACT

A random copolymerized polyamide resin is prepared by reacting a lactam of the formula (I):

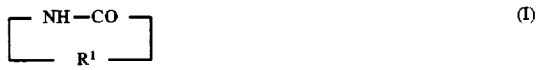

wherein $R^1$ is a $C_{2-11}$ alkylene group optionally substituted with a substituent having 1 to 6 carbon atoms, with a hexamethylenediamine-adipic acid salt while concentrating the aqueous solution of the salt to a concentration of at least 70% by weight and while maintaining a uniform reaction phase at all times by controlling the pressure over and the temperature of the reaction medium such that the hexamethylenediamine-adipic acid salt does not precipitate, said pressure being up to not greater than 2 kg/cm$^2$·G and said temperature being up to not greater than 150° C., and then mixing in the solution of the lactam of formula (I) thereby effecting copolymerization and forming a polyamide resin having a relative viscosity measured by the sulfuric acid solution method (1% at 25° C.) of 1.5 to 8.0.

15 Claims, No Drawings

RANDOM COPOLYMERIZED POLYAMIDE RESIN AND PROCESS FOR PREPARING THE SAME

BACKGROUND OF THE INVENTION

This invention relates to a random copolymerized polyamide resin and a process for preparing the same, specifically to a copolymerized polyamide resin having a high randomization rate and excellent transparency, and a process for preparing the same.

A nylon (trade name) salt, for example, a salt comprising hexamethylenediamine and adipic acid is obtained generally in the state of the so-called nylon® salt aqueous solution by adding an equivalent amount of a dicarboxylic acid to an aqueous solution of a diamine. However, this nylon® salt aqueous solution has low concentration and in a stage of preparing a starting material solution, it is required that the solution has low concentration from the point of solubility so that when the nylon® salt aqueous solution is copolymerized with a lactam, it is necessary to remove water which is a solvent at the time of copolymerization. Therefore, the nylon® salt aqueous solution is generally concentrated before copolymerization.

In the prior art, such a concentration method has been studied variously. However, when concentration is carried out together with a copolymerization reaction in a copolymerization reaction vessel, a period of time required for concentrating the nylon® salt aqueous solution generally becomes as long as double or longer of a copolymerization reaction time, whereby productivity per reaction vessel is significantly lowered.

On the other hand, in order to solve the above problem, it has been known to provide a concentrator before a copolymerization reaction vessel to concentrate the nylon® salt aqueous solution. However, when the nylon® salt aqueous solution is concentrated to high concentration, it becomes thermally unstable, and polymerization proceeds easily, an oligomer or a polymer produced thereby may cause a rise in viscosity, and blocking may be caused by precipitation of solid matter, which is caused from a reason that a nylon® oligomer singly produced from the nylon® salt becomes undissolved. Further, if supply of the nylon® salt aqueous solution to a copolymerization reaction vessel is delayed thereby, much danger is involved so that the nylon® salt aqueous solution cannot be concentrated to high concentration. From this meaning, various means have been used for concentrating the nylon® salt aqueous solution while maintaining a uniform phase state, and there have been reported a method of adding a specific rate of a lactam to a nylon® salt and others (e.g., Japanese Provisional Patent Publication No. 10693/1978).

SUMMARY OF THE INVENTION

An object of the present invention is to provide a copolymerized polyamide resin which can solve the above problems and is more abundant in transparency, has a high industrial value particularly in the field of monofilaments or the like where transparency is strongly desired and has a higher randomization rate as compared with a polyamide copolymer resin having the same polymer compositional ratio.

The present inventors have found that in the transparency of a copolymer of a lactam and a salt of dicarboxylic acid and diamine (hereinafter referred to as "nylon® salt"), sequences thereof are important; when a copolymer of a lactam and a nylon® salt is prepared, the sequences of polymers obtained are different depending on the preparation conditions or the like; and particularly in order to obtain a more randomized combination, concentrating conditions of a nylon® salt are extremely important. They have found the following that it is generally liable to be considered that a random polymer is more stable than a block polymer so that copolymerization naturally tends to be a randomization. However, the sequence which can exist most stably is not necessarily in a completely random state, but the point at which a sequence can be obtained most stably exists in the region where a sequence has slightly blocking property, and in order to make the sequence more random, a considerable means is required. That is, it is indispensable to obtain a means in which only a direct polyaddition reaction of a uniform nylon® salt solution in which its content has reached to a higher concentration degree and a lactam proceed preferentially, and further in order to obtain a nylon® salt which has a high concentration degree and is uniform, it is required to carry out concentration at the lowest possible temperature and pressure so long as a uniform phase can be maintained. Based on the above findings, the present invention has been accomplished.

That is, the present invention relates to a random co-polymerized polyamide resin obtainable by reacting a lactam represented by the formula (I):

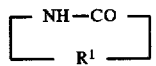
(I)

wherein $R^1$ represents an alkylene group having 2 to 11 carbon atoms which may have a substituent(s) having 1 to 6 carbon atoms, with a salt of dicarboxylic acid and diamine represented by the formula (II):

(II)

wherein $R^2$ and $R^3$ each represent a divalent aliphatic hydrocarbon group having 1 to 20 carbon atoms, a divalent aromatic hydrocarbon group having 6 to 20 carbon atoms or a divalent alicyclic hydrocarbon group having 3 to 20 carbon atoms, which comprises having a randomization rate represented by the following numerical formula (A):

$$\text{Randomization rate (mole \%)} = \left[ 1 - \frac{(Ac \cdot Am)}{(Ac \cdot LC) + (Ac \cdot Am)} \right] \times 100 \quad (A)$$

wherein (Ac·Am) and (Ac·LC) each represent a signal strength of carbonyl carbon marked with * of the following formula:

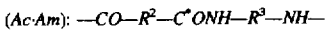

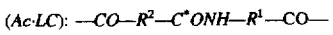

wherein $R^1$, $R^2$ and $R^3$ have the same meanings as defined above, obtained by 13C-NMR spectrum of 80 mole % or more and a relative viscosity measured by the sulfuric acid solution method (1% at 25° C.) of 1.5 to 8.0.

The above random copolymerized polyamide resin can be prepared by concentrating a nylon® salt aqueous solution to a concentration of 70% by weight or more while maintaining a uniform phase at all times at a pressure and a temperature at which the nylon® salt is not precipitated or more/higher and yet at a pressure of 2 kg/cm$^2$·G or less and a temperature of 150° C. or lower, and then mixing the solution with the lactam to effect copolymerization.

DESCRIPTION OF THE PREFERRED EMBODIMENTS

In the following, the present invention is explained in detail.

The nylon® salt to be used in the present invention is a salt comprising equimolar amounts of a diamine and a dicarboxylic acid which can form a polyamide. As an example of the diamine, there may be mentioned aliphatic diamines having 1 to 20 carbon atoms such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tetradecamethylenediamine, hexadecamethylenediamine and octadecamethylenediamine, and aromatic and alicyclic diamines such as metaxylylenediamine and isophoronediamine, preferably a diamine having an alkylene group with 6 to 12 carbon atoms such as hexamethylenediamine, heptamethylenediamine, octamethylenediamine, nonamethylenediamine, decamethylenediamine, undecamethylenediamine and dodecamethylenediamine.

As an example of the dicarboxylic acid, there may be mentioned an aliphatic dicarboxylic acid having 1 to 20 aliphatic carbon atoms such as adipic acid, azelaic acid, sebacic acid, decanedicarboxylic acid, undecanedicarboxylic acid and dodecanedicarboxylic acid; an alicyclic dicarboxylic acid having 3 to 20 alicyclic carbon atoms such as cyclohexanedicarboxylic acid; and an aromatic dicarboxylic acid having 6 to 20 aromatic carbon atoms such as terephthalic acid, isophthalic acid, 4-methylisophthalic acid and naphthalenedicarboxylic acid (particularly 2,6-, 2,7- and 1,4-isomers).

As an example of a preferred nylon® salt prepared from the diamine and the dicarboxylic acid described above, there may be mentioned a hexamethylenediamine-adipic acid salt (hereinafter referred to as "the AH salt"), a hexamethylenediamine-sebacic acid salt (hereinafter referred to as "the SH salt"), a hexamethylenediamine-azelaic acid salt (hereinafter referred to as "the ZH salt"), a hexamethylenediamine-isophthalic acid-terephthalic acid salt (herein-after referred to as "the ITH salt"), an octamethylenediamine-adipic acid salt and an octamethylenediamine-sebacic acid salt. In the above ITH salt, several kinds of dicarboxylic acids may be contained.

As the lactam having 2 to 11 alkylene atoms to be used in the present invention, there may be mentioned butyrolactam, valerolactam, caprolactam, enantiolactam, capryllactam, laurolactam or a lactam derivative having at least one substituent with 1 to 6 carbon atoms on carbon of a lactam ring.

The above nylon® salts and lactams may be used singly or in combination of two or more simultaneously, respectively.

The copolymerization ratio of the lactam and the nylon® salt is not limited, but a composition comprising 50 mole % or less, preferably 30 mole % or less of the nylon® salt is the most general. If the ratio of the nylon® salt is too high, the ratio of condensing the salts to each other is necessarily heightened, whereby a random copolymer with the lactam is formed with difficulty.

The randomization rate (mole %) is determined by utilizing, reading and integrating a chemical shift difference which appears to be slightly different depending on a substituent adjacent to carbonyl carbon (marked with C* in the following formulae) in 13C—NMR spectrum to calculate the signal strength of each carbonyl carbon by the above numerical formula (A).

For example, in the case of ε-caprolactam and the AH salt, the $^{13}$C-NMR chemical shift can be measured at a concentration of 1% in $D_2SO_4$ (400 MHz).

| | |
|---|---|
| —NH(CH$_2$)$_5$C*ONH(CH$_2$)$_5$CO— | 179.3 ppm |
| —CO(CH$_2$)$_4$C*ONH(CH$_2$)$_5$CO— | 178.5 ppm |
| —NH(CH$_2$)$_5$C*ONH(CH$_2$)$_6$NH— | 179.0 ppm |
| —CO(CH$_2$)$_4$C*ONH(CH$_2$)$_6$NH— | 178.2 ppm |

In the present invention, as a standard substance of the chemical shift, tetramethylsilane (hereinafter referred to as "TMS") was used.

This chemical shift difference is extremely close and can be read with difficulty depending on the kind of the adjacent substituent, but it can be differentiated by changing a solvent.

The nylon® salt aqueous solution is prepared generally by dissolving the nylon® salt uniformly in water to a concentration of 20 to 50% by weight at a temperature of 30 to 80° C. under nitrogen atmosphere in the first place. Next, the nylon® salt aqueous solution in which the nylon® salt is dissolved uniformly is concentrated, and this step is the most important. That is, solubility and supersolubility curves of the nylon® salt are drawn, and concentration is carried out under conditions of the very limit of supersolubility, i.e., under conditions of the lowest possible temperature and pressure (a pressure of 2 kg/cm$^2$·G or less) within the supersaturation range and at a final temperature of 140° to 150° C.

Specifically, when concentration is carried out until reaching the concentration of the aqueous solution to 70% by weight while maintaining a pressure of 2 kg/cm$^2$·G, the final temperature may vary depending on the kind of the nylon® salt, but reaches to a range of 140° to 150° C. On the other hand, when the nylon® salt aqueous solution is concentrated while maintaining a pressure of 1.5 kg/cm$^2$·G, the solution can be concentrated up to 80% by weight at the same temperature range as mentioned above. That is, when the pressure at the time of concentration is lowered, the nylon® salt having a high concentration degree can be obtained at lower temperature, but depending on the kind of the salt, the salt may enter into a region exceeding its solubility. Particularly when a concentration degree exceeding 85% by weight is selected, in the case of the AH salt, the salt is precipitated at a pressure of 1.0 kg/cm$^2$·G and a temperature of 150° C. When the nylon® salt aqueous solution is concentrated at constant pressure, the temperature is determined unequivacally by the concentration degree. Therefore, when the salt having a high concentration degree is to be obtained, high temperature is required under constant pressure. In the case of the nylon® salt, at high temperature (150° C. or higher), oligomerization of the salts proceeds undesirably. The concentration degree of the nylon® salt aqueous solution is at least 70% by weight, preferably 75% by weight or more, more preferably 80% by weight or more. As a matter of course, this concentration degree is preferably the highest possible concentration degree in the range of supersaturation so long as oligomerization of the salts can be avoided.

This is because if the concentration degree is low, the amount of water accompanied with the nylon® salt at the time of copolymerization is large to cause ring opening of a lactam, and as a result, the rate of polyaddition polymerization of the nylon® salt and the lactam is reduced to lower a randomization rate. On the other hand, if the concentration degree is too high, condensation of the nylon® salts occurs before shifting to a next operation as described above, whereby a randomization rate is also lowered.

For example, in the case of the AH salt, when the concentration degree is 82% by weight, conditions of 1.5 kg/cm²·G and 150° C. can be selected. However, when the concentration degree is too high (e.g., 1.0 kg/cm²·G, 150° C., concentration degree: 85% by weight), the AH salt exceeds its supersolubility, precipitation of the salt in the course of concentration is observed, and once the salt is precipitated, temperature and pressure are required to be raised for dissolving the precipitated salt again, whereby a desired nylon® salt aqueous solution having a high concentration degree cannot be obtained. On the other hand, when the pressure is too high (e.g., 2.5 kg/cm2-G), if the concentration degree is to be heightened (e.g., 80% by weight), the temperature necessarily becomes high (e.g., 160° C.), so that an oligomer of the nylon® salts is produced at the time of concentration undesirably. Therefore, it is necessary to heighten a concentration degree within the range of supersolubility while maintaining the lowest possible temperature and pressure. When the nylon® salt aqueous solution is concentrated, for the purpose of making a supersaturation region wider, a slight amount of a lactammay be added to the nylon® salt aqueous solution. As described above, the nylon® salt aqueous solution having high concentration is added to the lactam so that a desired copolymer composition is obtained, to effect copolymerization with a polyaddition reaction of the nylon® salt and the lactam being made to proceed preferentially. The conditions of this copolymerization are not particularly limited, but it is not preferred that when the nylon® salt aqueous solution obtained at high concentration is added to the lactam, the temperature of the salt becomes a low temperature exceeding supersolubility. Therefore, it is generally preferred to use a lactam maintained at higher temperature than the temperature of the nylon® salt (generally at 140° to 300° C.). Further, when the polyaddition reaction of the nylon® salt and the lactam proceeds, it is not preferred that the reaction temperature is lower than the melting points of an oligomer and/or a polymer produced since the oligomer and/or the polymer is/are precipitated. For this reason, it is generally preferred to maintain the lactam subjected to the polyaddition reaction with the nylon® salt, at a temperature which is the melting point or higher of a copolymer corresponding to the copolymer composition (generally at 180° to 270° C.). The copolymerization is carried out generally under pressurization of about 1 kg to 30 kg, followed by condensation under reduced pressure.

For example, in the case of the AH salt, it is preferred that in a pressure range of 0.5 to 1.5 kg/cm²·G, the AH salt aqueous solution is concentrated to a concentration of 70% by weight or more at 125° to 140° C., a concentration of 80% by weight or more at 132° to 148° C., a concentration of 85% by weight or more at 142° to 150° C. and a concentration of 90% by weight or more at 147° to 150° C., respectively, and then the solution is copolymerized with the lactam.

In the case of the ZH salt or the SH salt, it is preferred that in a pressure range of 0.5 to 1.5 kg/cm²·G, the ZH salt or SH salt aqueous solution is concentrated to a concentration of 70% by weight or more at 118° to 135° C., a concentration of 80% by weight or more at 125° to 143° C., a concentration of 85% by weight or more at 133° to 150° C. and a concentration of 90% by weight or more at 140° to 150° C., respectively, and then the solution is copolymerized with the lactam.

In the case of the ITH salt (isophthalic acid/terephthalic acid mol ratio=2/1 to 1/0, preferably 2/1 to 4/1), it is preferred that in a pressure range of 1.0 to 2.0 kg/cm²·G, the ITH salt aqueous solution is concentrated to a concentration of 70% by weight or more at 130° to 143° C. and a concentration of 80% by weight or more at 138° to 152° C., respectively, and then the solution is copolymerized with the lactam.

The randomization rate of the random copolymerized polyamide resin obtained by the above process is 80 mole % or more, preferably 90 mole % or more.

The molecular weight of the copolymerized oligomer or polymer thus obtained is heightened (by condensation) by a general means. When a fundamental principle that the nylon® salt aqueous solution obtained at high concentration and stably is subjected to polyaddition with the lactam is kept, a copolymerization system may be a batch system or a continuous system. With respect to the molecular weight of the random copolymerized polyamide resin of the present invention, the relative viscosity measured according to the sulfuric acid solution method of JIS K6810 is 1.5 to 8.0, preferably 2.5 to 5.0. If the relative viscosity is less than 1.5, necessary strength cannot be obtained, while if it exceeds 8.0, molding cannot be carried out easily.

In the process of the present invention, other additive such as a colorant such as a dye and a pigment, a weatherability-improving agent and an antistatic agent may be added to the nylon® salt aqueous solution.

EXAMPLES

The present invention is described in detail by referring to Examples, but the present invention is not limited by Examples.

Examples 1 to 4

An autoclave (volume: 180 liters) equipped with a jacket was charged with each nylon® salt aqueous solution shown in the following Table 1, and the solution was concentrated to a final concentration at a final temperature shown in Table 1 while maintaining a pressure shown in Table 1. At this time, the nylon® salt was within the range of solubility and concentrated uniformly. Then, the concentrated salt aqueous solution is thrown into ∈-caprolactam heated to 240° C., and the temperature of the mixture was raised to 260° C. under stirring while maintaining the pressure at 13 kg/cm²·G to effect copolymerization under pressurization. Subsequently, the pressure was released, and the resulting polymer was kept under reduced pressure (420 Torr) for 2 hours to be condensed. After stirring was stopped, the pressure was returned to 13 kg/cm²·G by nitrogen gas. The resin was pulled out in a strand state, and after cooling, the strands were cut into chips.

From the chips obtained, unreacted monomer and oligomer were extracted with hot water, and the residue was dried under vacuum at 120° C. and a pressure of 1 Torr for 5 hours to obtain a product.

The product thus obtained was dissolved in $D_2SO_4$. After $^{13}C$-NMR spectrum of each carbonyl carbon was measured by using TMS as an internal standard, each carbon was integrated to determine a randomization rate by the numerical formula (A).

The pellets of the random copolymerized polyamide resin thus obtained were extruded at a resin temperature of 260° C. into a cooling tank (cooling tank length: 1 m) at a water temperature of 10° C. by using an extruder (an extruder having a size of 50 mm) equipped with dices having a hole size of 6.5 mm. At a haul-off rate of 7.5 m/min, the extruded resin was subjected to first-stage stretching (3.8 times) using steam at 100° C., 2nd dry heat stretching (1.37 times) at 270° C. and heat treatment (0.96 time) at 265° C. to obtain monofilaments (size: 2 mm) which were stretched 5 times in total.

Measurement of relative viscosity was carried out according to the method for measuring viscosity using a 98% $H_2SO_4$ solution (JIS K6810).

As a means for showing the effect of the invention, the transparency of the monofilaments obtained was evaluated. The transparency is a value measured by using an Optical power meter (trade name, produced by Soar Co.), and as the value is smaller, transparency is better.

The results are shown in Table 1.

Comparative Examples 1 and 2

Procedures were carried out in the same manner as in Examples 1 to 4 except for concentrating each nylon® salt at a pressure shown in Table 1 and at a final temperature shown in Table 1. The results are shown in Table 1.

TABLE 1

| Nylon ® salt | Example 1 AH | Comparative example 1 AH | Example 2 ZH | Example 3 ITH | Comparative example 2 ITH | Example 4 AH |
|---|---|---|---|---|---|---|
| Initial concentration (% by weight) | 50 | 50 | 30 | 30 | 30 | 50 |
| Pressure (kg/cm² · G) | 1.5 | 2.5 | 0.5 | 1.5 | 3.0 | 1.0 |
| Final temperature (°C.) | 150 | 160 | 140 | 146 | 170 | 140 |
| Final concentration (% by weight) | 82 | 80 | 90 | 80 | 85 | 80 |
| Nylon ® salt copolymerization rate (mole %) | 9.7 | 9.7 | 8.5 | 9.1 | 9.1 | 22.3 |
| Randomization rate (mole %) | 90 | 60 | 92 | 85 | 65 | 80 |
| Relative viscosity | 3.70 | 3.75 | 3.71 | 3.52 | 3.44 | 3.21 |
| Precipitation of white foregin matter | None | None | None | None | None | None |
| Transparency of monofilament (−dBm) | 16 | 28 | 11 | 10 | 21 | 8 |

The random copolymerized polyamide resin prepared by the present invention is more random as compared with a polyamide copolymer resin having the same copolymer compositional ratio so that it is more abundant in transparency and has a high industrial value particularly in the field of monofilaments or the like where transparency is strongly desired.

We claim:

1. A process for preparing a random copolymerized polyamide resin by reacting a lactam of formula (I):

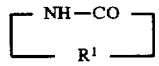   (I)

wherein $R^1$ is a $C_{2-11}$ alkylene group optionally substituted with a substituent having 1 to 6 carbon atoms, with a hexamethylenediamine-adipic acid salt under conditions which comprise concentrating an aqueous solution of the salt to a concentration of at least 70% by weight while maintaining a uniform reaction phase at all times under a pressure and at a temperature at which the hexamethylenediamine-adipic acid salt does not precipitate up to a pressure not greater than 2 kg/cm²·G and up to a temperature not greater than 150° C., and then mixing in the solution of the lactam of formula (I) and effecting copolymerization, thereby forming a polyamide resin having a relative viscosity measured by the sulfuric acid solution method (1% at 25° C.) of 1.5 to 8.0.

2. The process according to claim 1, wherein the lactam is selected from the group consisting of butyrolactam, valerolactam, caprolactam, enantiolactam, capryllactam and laurolactam.

3. The process according to claim 1, wherein the lactam is ε-caprolactam.

4. The process according to claim 1, wherein an amount of the salt added to the reaction system is 50 mole % or less.

5. The process according to claim 1, wherein an amount of the salt added to the reaction system is 30 mole % or less.

6. A process for preparing a random copolymerized polyamide resin by reacting a lactam of formula (I):

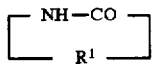   (I)

wherein $R^1$ is a $C_{2-11}$ alkylene group optionally substituted with a substituent having 1 to 6 carbon atoms, with a hexamethylenediamine-sebacic acid salt or a hexamethylenediamine-azelaic acid salt, which comprises concentrating an aqueous solution of one of said salts to a concentration of at least 70% by weight while maintaining a uniform reaction phase at all times under a pressure of and at a temperature at which the hexamethylenediamine-sebacic acid salt or the hexamethylenediamine-azelaic acid salt does not precipitate up to a pressure not greater than 2 kg/cm²·G and up to a temperature not greater than 150° C., and then mixing in the solution of the lactam to effect copolymerization, thereby forming a polyamide resin having a relative viscosity measured by the sulfuric acid solution method (1% at 25° C.) of 1.5 to 8.0.

7. The process according to claim 6, wherein the lactam is selected from the group consisting of butyrolactam, valerolactam, caprolactam, enantiolactam, capryllactam and laurolactam.

8. The process according to claim 6, wherein the lactam is ε-caprolactam.

9. The process according to claim 6, wherein an amount of the salt added to the reaction system is 50 mole % or less.

10. The process according to claim 6, wherein an amount of the salt added to the reaction system is 30 mole % or less.

11. A process for preparing a random copolymerized polyamide resin by reacting a lactam of the formula (I):

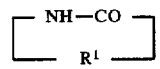   (I)

wherein $R^1$ is a $C_{2-11}$ alkylene group optionally substituted with a substituent having 1 to 6 carbon atoms, with a hexamethylenediamine-isophthalic acid-terephthalic acid salt, the isophthalic acid/terephthalic acid mole ratio ranging from 2/1 to 1/0, which comprises concentrating an aqueous solution of the salt to a concentration of at least 70% by weight at 130°–143° C. or to a concentration of at least 80% by weight at 138° to 152° C. in a pressure range of 1.0 to 2.0 kg/cm²·G, and then mixing in the solution with the lactam to effect copolymerization.

12. The process according to claim 11, wherein the lactam is selected from the group consisting of butyrolactam, valerolactam, caprolactam, enantiolactam, capryllactam and laurolactam.

13. The process according to claim 4, wherein the lactam is ε-caprolactam.

14. The process according to claim 11, wherein an amount of the salt added to the reaction system is 50 mole % or less.

15. The process according to claim 11, wherein an amount of the salt added to the reaction system is 30 mole % or less.

* * * * *